United States Patent

Warner

[11] Patent Number: 6,017,079
[45] Date of Patent: Jan. 25, 2000

[54] VEHICLE CAMOUFLAGE CONVERSION KIT AND METHOD OF USING SAME

[76] Inventor: Joseph Warner, 5624 N. Marmora St., Chicago, Ill. 60646

[21] Appl. No.: 09/012,810

[22] Filed: Jan. 23, 1998

[51] Int. Cl.[7] ........................................................ B60J 7/20
[52] U.S. Cl. ........................ 296/136; 280/770; 118/505; 428/919
[58] Field of Search ............................ 296/136; 280/770; 150/166; 118/505; 428/919; 52/DIG. 14; 254/45, 47

[56] References Cited

U.S. PATENT DOCUMENTS

| | | | |
|---|---|---|---|
| 527,833 | 10/1894 | Davis | 150/166 |
| 1,584,518 | 5/1926 | Drake | 296/136 |
| 2,048,461 | 7/1936 | Mosgoffian | 296/136 |
| 2,807,356 | 9/1957 | Blum | 296/136 |
| 4,734,312 | 3/1988 | Sugiyama | 150/166 |
| 4,748,061 | 5/1988 | Vesley | 428/40 |
| 4,865,900 | 9/1989 | Shannon et al. | 428/195 |
| 5,209,545 | 5/1993 | Slaugh | 296/136 |
| 5,273,316 | 12/1993 | Infante | 296/136 |
| 5,494,726 | 2/1996 | Inomata | 428/131 |
| 5,549,938 | 8/1996 | Nesbitt | 428/919 |
| 5,725,933 | 3/1998 | Nishiyama | 150/166 |
| 5,778,590 | 7/1998 | Browning et al. | 42/96 |
| 5,820,201 | 10/1998 | Jabalee | 296/136 |

FOREIGN PATENT DOCUMENTS 0314676  12/1989  Japan ..................................... 296/136

*Primary Examiner*—Dennis H. Pedder
*Attorney, Agent, or Firm*—Vedder Price Kaufman & Kammholz

[57] ABSTRACT

A kit for outfitting the exterior surface of a vehicle is shown as being made up of a plurality of pressure-sensitive adhesive backed camouflage panels. Each of the panels may be adhered to a specific segment of the vehicle surface. The panels preferably include marginal strips that permit the panels to register with their associated segments of the vehicle. These marginal strips may also provide panel overlap portions to ensure complete surface coverage by the panels.

12 Claims, 6 Drawing Sheets

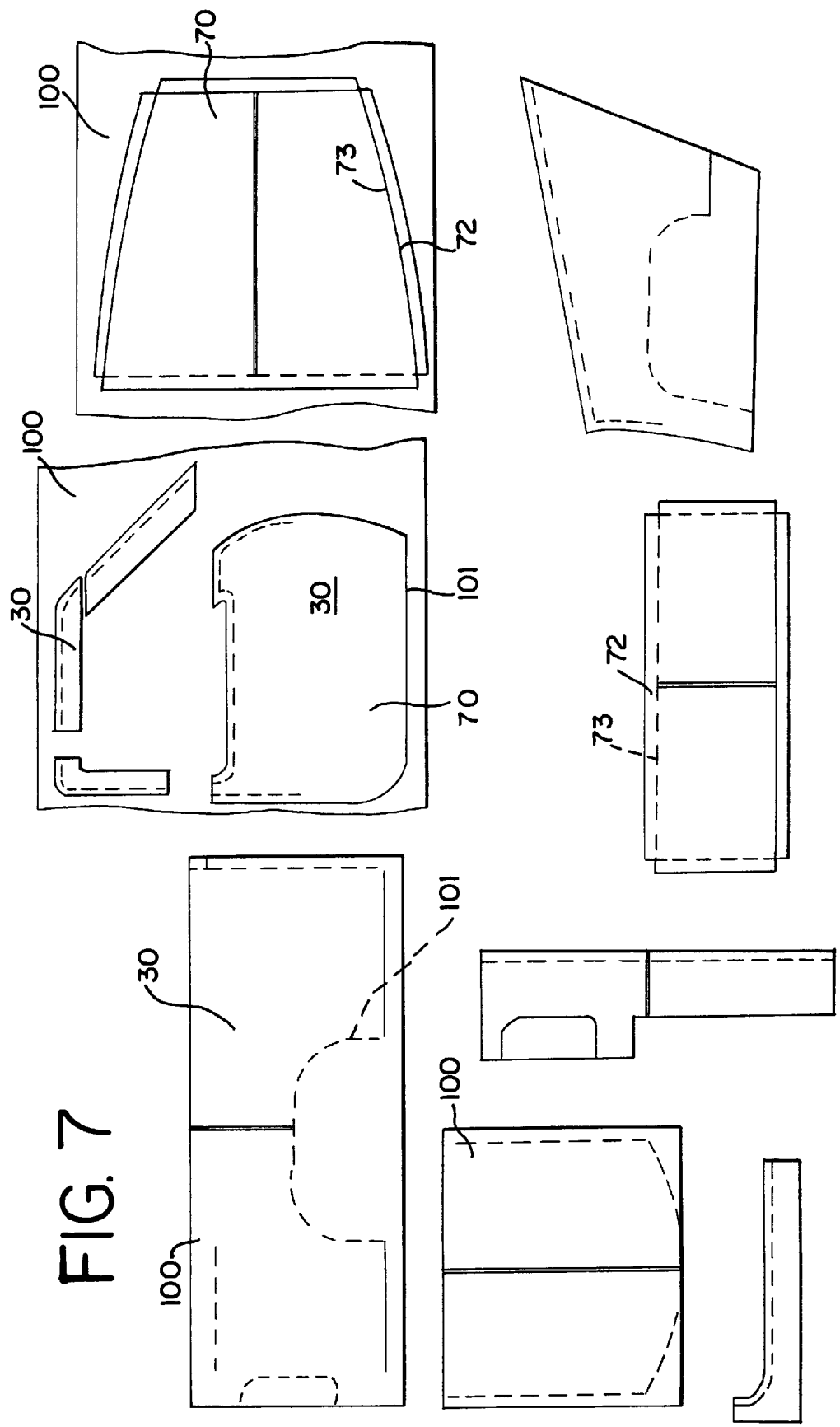

VEHICLE CAMOUFLAGE CONVERSION KIT AND METHOD OF USING SAME

BACKGROUND OF THE INVENTION

The present invention is generally directed to a kit for outfitting exterior surfaces of vehicles, boats or the like with a camouflage pattern to enhance hunting and/or military use of the vehicle. More particularly, the present invention is directed to a kit of pressure-sensitive, adhesive-backed vehicle cover panels that have camouflage color patterns imprinted thereon, with marginal strip portions that facilitate registration of the panels on a vehicle.

Various types of camouflaging techniques for hunting and/or military use of vehicles are well known in the art. The majority of these techniques include painting the vehicle with colors to create a desired camouflage color combination that preferably blends with the terrain at the site of hunting or military activity. These techniques typically necessitate application of paint directly to the vehicle surface, over a base primer or paint covering the vehicle. While alteration of the surface of a military vehicle may be acceptable because the military vehicle is used for no other purpose, re-painting of a civilian vehicle might be unacceptable for the occasional hunter who also uses his vehicle for activities other than hunting.

One type of camouflaging technique for vehicles is accomplished by mounting magnetic camouflage elements on the surface of the vehicle. This is described in U.S. Pat. No. 5,549,938, issued Aug. 27, 1996. Although the magnetic mounting may hold to the underlying vehicle panel in dry and normal weather, it is questionable if such panels will remain attached to the vehicle in inclement weather or cold temperatures. Such a system requires a magnetic backing layer that ranges between 20 to 60 mils in thickness. Due to this thickness, the magnetic mountings may not effectively adhere to curved surfaces or to small areas of the vehicle that contain dents, rust or other surface imperfections. Additionally, the thickness of these appliques render them insufficiently pliant to follow the contours of the vehicle.

The present invention is directed to a kit of camouflage panels that overcomes the aforementioned deficiencies.

SUMMARY OF THE INVENTION

The present invention overcomes these deficiencies by providing a kit of adhesive-backed panels that, in one embodiment, are pre-cut and shaped to fit various segments of a motor vehicle. Each panel includes a front face having a camouflage pattern imprinted thereon and a back face having an adhesive disposed thereon for mounting the panel to its associated vehicle body segment.

Each panel also includes at least one marginal strip that generally extends along one side of the panel and is separated from the body portion of the panel by vehicle registration or overlap lines imprinted on one of the faces thereof. These marginal strips not only permit accurate alignment of the panels in place over specific segments of the vehicle, but also may serve to define an overlap portion with an adjoining panel in order to cover all exterior surfaces of the vehicle.

In addition to effecting complete vehicle coverage, these marginal strips ensure that the edges of the adhesive-backed panels are not exposed to the environment. As a result, the panels, when adhered to the vehicle body, are able to withstand any otherwise undesirable effects resulting from the environment, such as inclement weather.

In another embodiment, the present invention includes a plurality of sheets of adhesive-backed camouflage printed material, with a plurality of panels defined thereon, each of the panels having a outline that defines a body portions and marginal strip portions of the panels, the body and marginal strip portions of the individual panels being separated by intervening registration lines. The panels may be cut from the sheet and applied to the vehicle after folding them along their respective registration lines.

It is therefore an object of this invention to provide a kit of adhesive-backed camouflage panels for application to exterior surfaces of a vehicle or boat.

Another object of the present invention is to provide a kit of removable, pressure-sensitive, adhesive-backed panels for converting a vehicle's exterior surface into a camouflage appearance enhancing hunting and/or military use of the vehicle.

Still another object of the present invention is to provide such a kit wherein the panels are designed to permit the entire vehicle surface to be covered with a camouflage pattern.

A further object of this invention is to provide a kit of vehicle cover panels that are designed to maintain their structural integrity even when they are exposed to inclement weather.

Yet another object of the present invention is to provide a kit of adhesive-backed panels that include marginal strips extending outwardly from the cover portion of the panel and separated from that cover portion by a vehicle registration line or a panel overlap line.

These and other objects, features and advantages of the present invention will become apparent from the following detailed description, taken in conjunction with the accompanying drawings, wherein like reference numerals refer to like parts.

BRIEF DESCRIPTION OF THE DRAWINGS

In the course of this detailed description, reference will be made to the accompanying drawings in which:

FIG. 7 is a plan view of a second embodiment of the present invention, in which the panels and their associated fold and registration lines are imprinted upon the surface of sheets of adhesive-backed material;

DETAILED DESCRIPTION OF THE PREFERRED EMBODIMENTS

Figure 1:
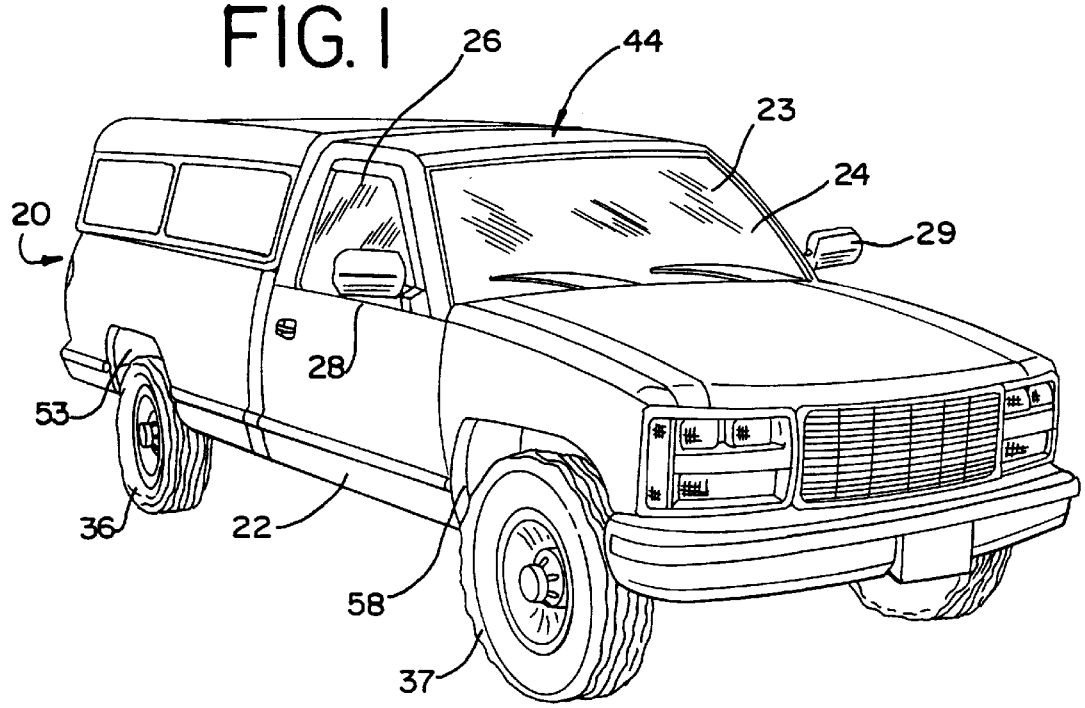
FIG. 1 is a perspective view of a vehicle, such as a standard pick-up truck suitable for conversion with a kit in accordance with the principles of the present invention.

Referring now to FIG. 1, there is shown a motor vehicle in the form of a pick-up truck 20. It will be understood that although the following description of the invention is phrased in terms of the motor vehicle 20 shown, the present invention also finds suitable utility on boats and all-terrain vehicles. Thus, the term "vehicle" shall have its broadest definition.

The truck 20 has a sheet metal body 22. The body 22 forms the exterior surfaces of the vehicle 20 that may be considered as having a plurality of discrete body segments, such as a door, a hood, a tailgate, quarter-panel, roof, etc. The truck 20 also includes a standard passenger compartment 23, and a front windshield 24 and side windows 26 that permit drivers and passengers of the vehicle seated within the compartment 23 to view the outside of the vehicle. Truck 20 further includes side view mirrors 28, 29 located on opposite sides of the truck.

Furthermore, the truck 20 includes conventional body aspects such as wipers, headlights, tires, door handles, grill and others. In addition, truck 20 includes a cab generally designated 44 having, among other things, two side windows 46, 48 on each side of the truck center line. It will be appreciated that a large number of additional components form truck 20. However, for present purposes, it is unnecessary to list them here because they are not part of the subject matter of the present invention.

Figure 2:
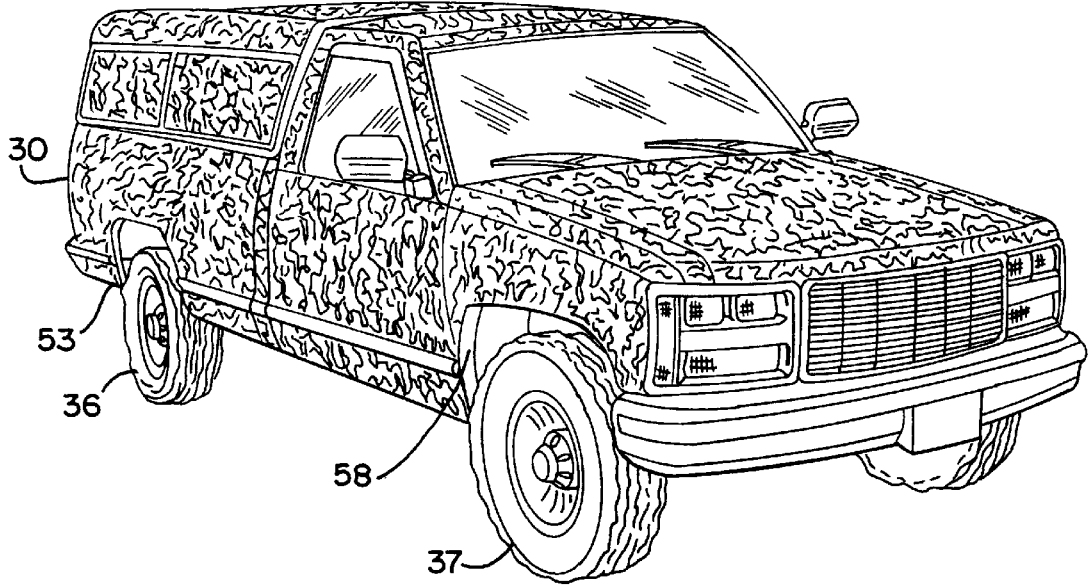
FIG. 2 is the same view as FIG. 1, with a kit of camouflage panels adhered to the exterior surfaces of the vehicle in accordance with the principles of the present invention.
Figure 4A:
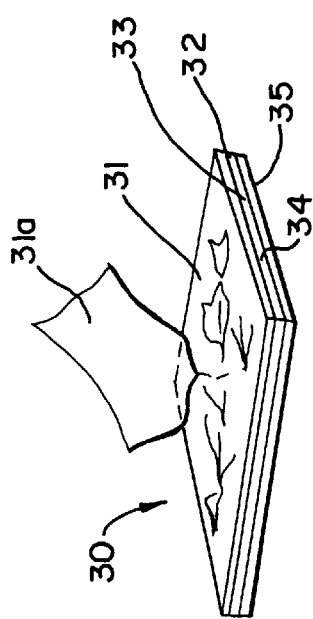
FIG. 4A is an enlarged perspective view of a camouflage panel that is used in the kit of FIG. 4.

Referring now to FIG. 2, the body 22 of truck 20 is shown to have a plurality of camouflage panels 30 adhered to various discrete body segments of the vehicle 20. Each panel 30, as illustrated best in FIG. 4A, has a camouflaged pattern or design imprinted on a top layer 31 that forms the conventional "top" face of each panel 30. The top layer 31 is preferably a flexible and durable plastic that may readily accept printing from typical processes, such as screen printing, for example. An adhesive layer 32 is disposed underneath and on the rear face of each panel and preferably includes a deposit of pressure-sensitive adhesive 33 thereupon. The top layer 31 may include a peelable pre-mask layer 31a that serves to protect the pattern imprinted on the layer 31 from scratches and mars. This pre-mask layer 31a is be peeled away from the layer 31 after installation. The pre-mask layer may have the various outline and registration lines printed directly thereon.

A third layer 34 in the form of a backing sheet 35 is provided to protect the adhesive. The panels 30 are preferably collectively provided within a kit specifically designed for camouflaging truck 20. The panels are pressure-sensitive and include back faces that form an adhesive to enable them to adhere to their associated segments of body 22.

Figure 3:
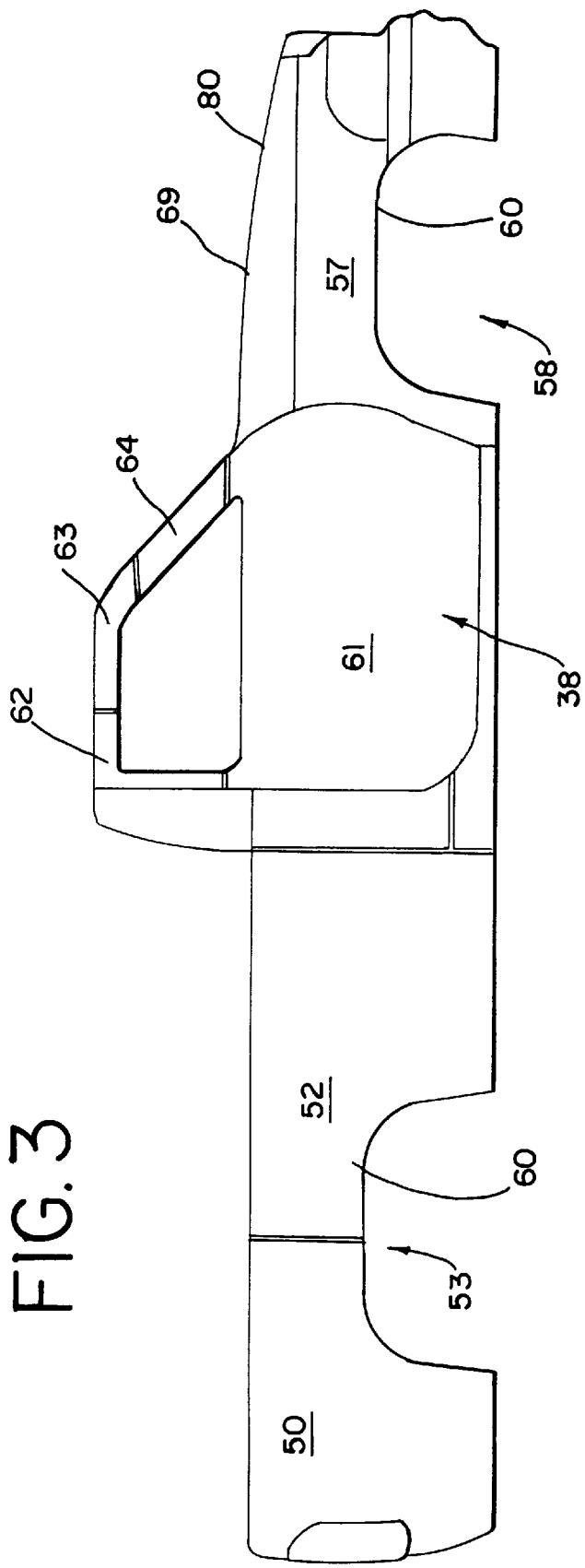
FIG. 3 is a side profile view of the vehicle of FIG. 1, but subdivided into discrete body segments.

The exterior surface of the vehicle 20 may be considered as having a plurality of discrete body segments. Some of the body segments cover entire body panel portions of the vehicle 20 such as the door, while others, such as the hood segment, may be divided into adjoining halves. In FIG. 3, the truck body 22 is shown in outline and includes first and second segments 50, 52 that cooperatively extend over the rear quarter-panel of the vehicle that includes a rear wheel well 53 that accommodates rear tire 36. A third segment 57 may be considered as including the front quarter-panel portion, that also extends over a front wheel and defines a wheel well 58. The contours 59 of each wheel well 53, 58 include curved edges 60.

The truck body 22 further includes additional segments 61–64 that cooperatively define the exterior surfaces of the vehicle door 38. Two additional segments 66, 67 cooperate to define the rear wall of the vehicle cab 44. Still other segments of the exterior surface of the vehicle may be defines, such as hood portions 69, 70 and rear tailgate portion, for example. It will be appreciated that the segments are preferably defined within the context of existing body lines of the vehicle as well as edges of doors, hoods, trunks and the like.

Figure 4:
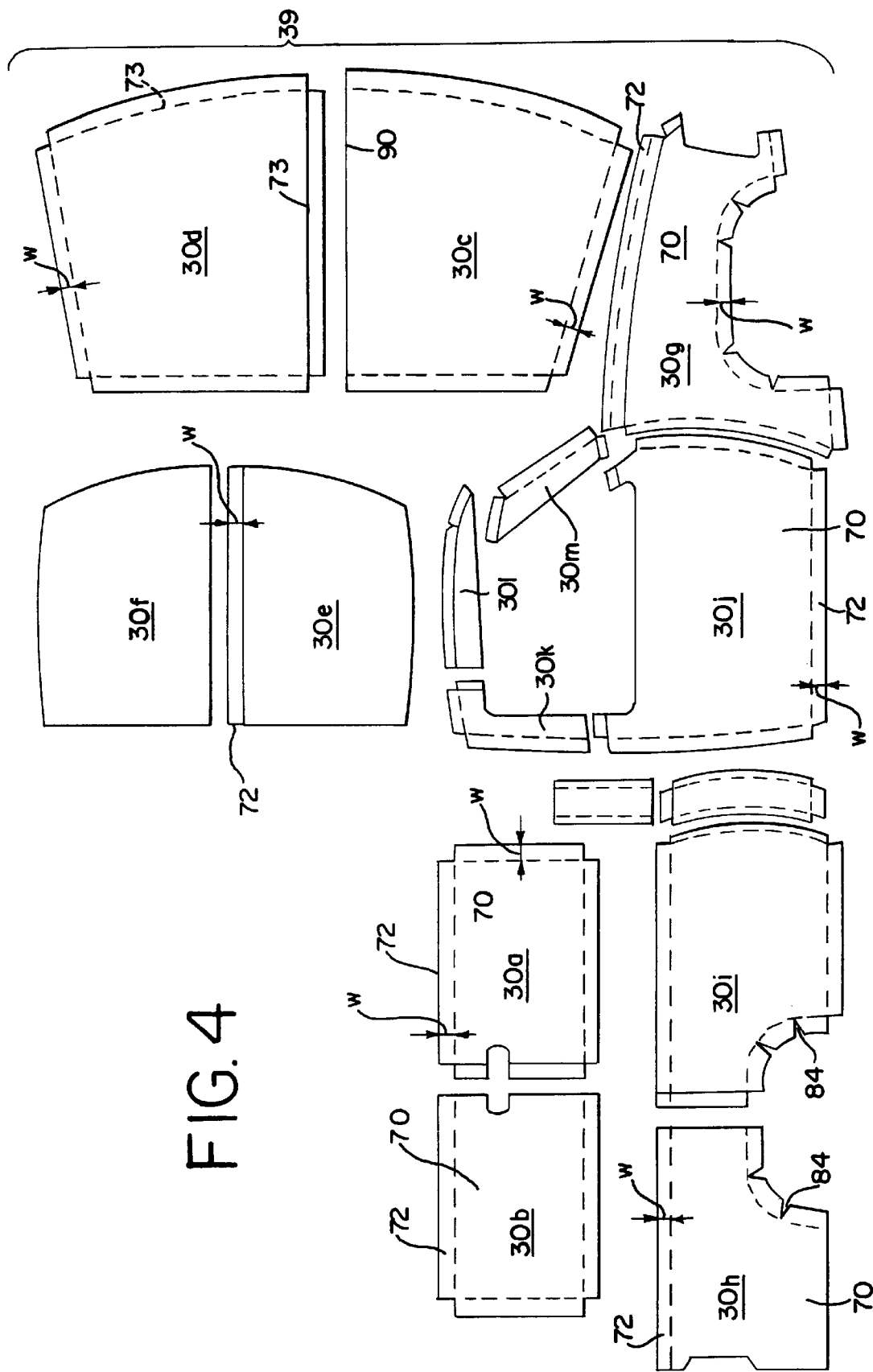
FIG. 4 is a plan view of a kit of pressure-sensitive, adhesive-backed camouflage panels that are pre-cut and printed to fit onto specific body segments of the vehicle of FIG. 1.

Referring now to FIG. 4, the panels 30 are applied to the various segments into which the vehicle exterior surface has been divided and in such application, the panels 30 are registered together with one another so as to cover substantially all of the exterior surface of the vehicle 20. In order to facilitate the application of the panels 30, a illustrated in FIG. 4, the panels 30 may be pre-cut into discrete panels that correspond to a specific body segment. In this regard, the panels 30 may be supplied in the form of a kit to an enduser wherein the panels 30 are dimensioned and pre-cut to fit a particular vehicle, thereby facilitating the installation thereof by an enduser.

FIG. 4 illustrates such a kit 39 of panels 30. The panels 30 approximate the shape and size of their corresponding segments of the exterior surface of the vehicle 20. Included among the panels are two tailgate panels 30a, 30b that may be cut from a single, large sheet of panel material. Also included in the kit 39 are a pair of cooperating hood panels 30c, 30d, roof panels 30e, 30f, a front quarter-panel 30g, a pair of rear quarter-panels 30h, 30i, door panels 30j–m and cab panels 30n, 30p. For clarity, the left side door, front and rear quarter-panels and cab panels are omitted from FIG. 4 for clarity.

Figure 5:
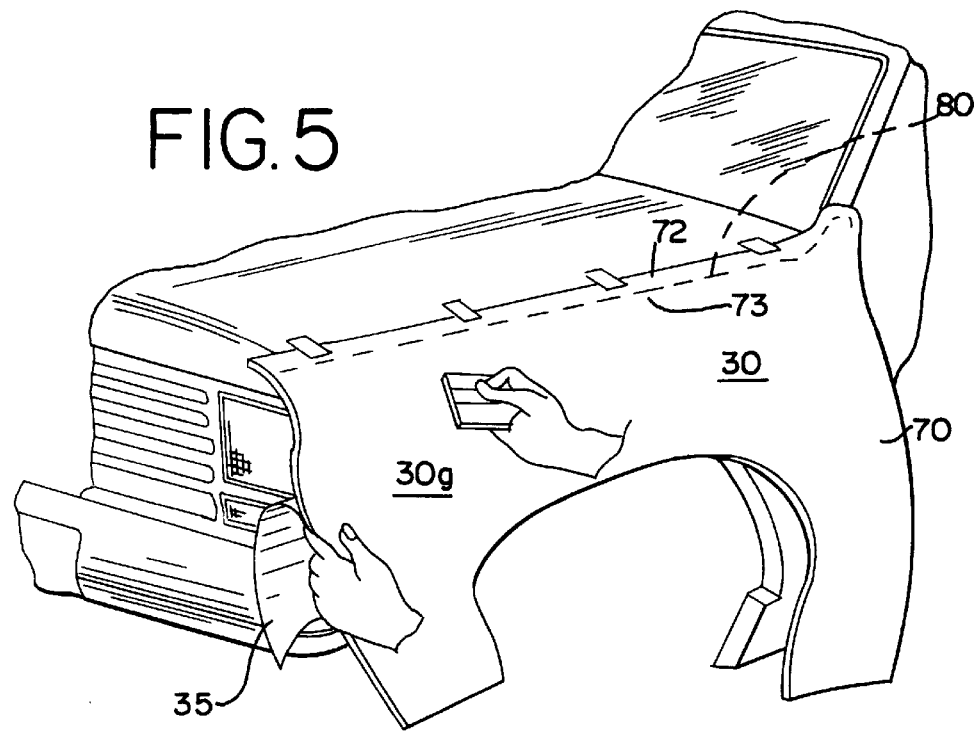
FIG. 5 is a detailed perspective view of a front fender, or quarter-panel of the vehicle of FIG. 1 illustrating the registration of the panel to an edge of the vehicle and application of the panel to a body segment of the vehicle.

The most of the panels 30 of the kit 39 include a means for registering the panels 30 in place on their respective vehicle body segments. This registration means is illustrated in FIGS. 4, 5 as marginal strip portions 72 that lie adjacent to the main body portions 70 of the panels 30. These strips 72 extend away from the panel body portions 70 and are separated therefrom by registration, or mating, line 73 that may be printed either on the top surface 31 of the panels or the backing layer 35 thereof.

Figure 9:
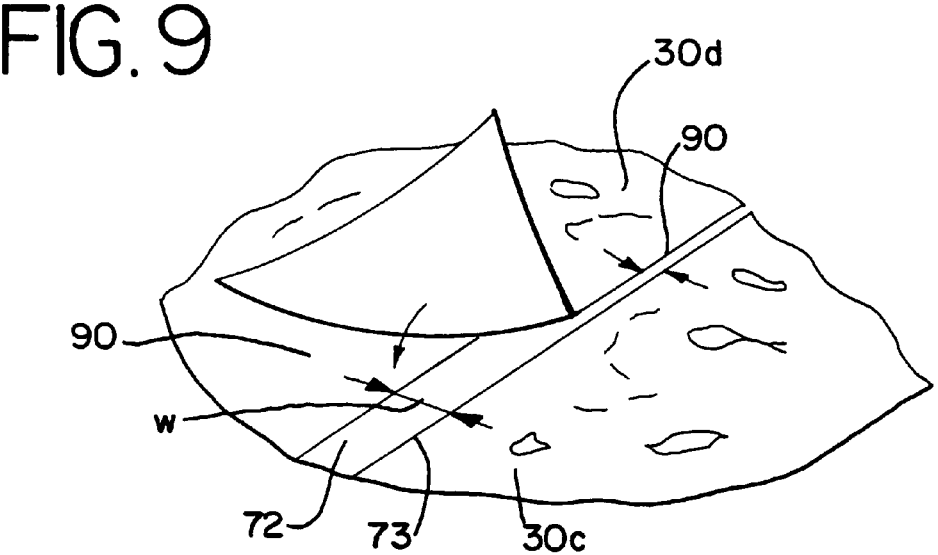

These lines 73 facilitate registration of the panels 30 on their associated body segment and also facilitate the mating of adjoining panels such as the hood and roof panels 30e–f and 30c–d together. In application of the panels 30 to a vehicle 30, as best illustrated in FIG. 5, a front quarter-panel 30g is folded along its registration line 73, and that fold is aligned with a body line 80 of the vehicle. It is preferable that the registration line 73 be coincident with the vehicle body line 80, but not absolutely necessary. The width W of the marginal strip portions 72 is preferably large enough to provide some measure of coverage onto the body segment adjoining the vehicle body line 80 as well as a base for an adjoining panel 30 to cover. In the case of the hood panel 30c–d shown in FIGS. 4 and 9, the edge 90 of panel 30c may be mated with the registration line 73 of panel 30d, and if the mating is not exact, the marginal strip portion 72 will cover any portion of the vehicle exterior surface between the two panels 30c–d. In installation, one such panel 30c is laid down on the vehicle body segment, such as the vehicle hood with its registration line 73 aligned with a corresponding body line (not shown) of the vehicle. An adjacent mating panel 30d (the corresponding other hood panel) is placed next to it so that a mating edge 90 thereof mates with the registration line 73 of the panel 30c. The width W of the marginal strip portion 72 is such that it prevents any portion of the vehicle exterior surface 91 from being exposed.

Figure 8:
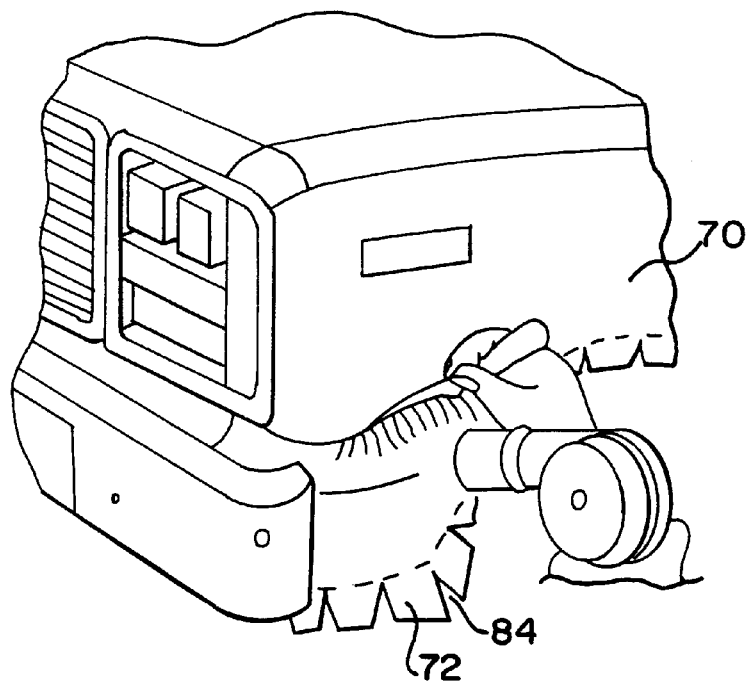
FIG. 8 is a detailed perspective view of a front fender portion of the vehicle of FIG. 1 illustrating the application of such a panel to a body segment having a curved surface; and, FIG. 9 is a perspective view of the mating of two adjoining panels onto a body segment of a vehicle.

In some instances, such as with the front or rear quarter-panels 50, 52 or 57 of the vehicle, the vehicle body segments shall have curved edges 60 to which panels must be applied. In order to ensure that the corresponding panel 30 will mate with these edges 60, the marginal strip portions 72 may contain a series of slits 84 or may have lines identifying such slits printed thereon. When slit, the marginal strip portions 72 are subdivided and may be folded over the curved edges 60 as shown best in FIG. 8. To facilitate the installation on curved contoured portions of the vehicle body. the panels 30 may be heated with a hot air gun or an electric dryer as illustrated in FIG. 8. Once heated, the panel material may be forced into the contours, such as by using a brush 85.

In the application process, it is preferred that the surface temperature of the vehicle be at least 55° F. or above. If necessary, the surface may be heated in a garage to the desired temperature by using a portable heater or heat lamps. The surface should also be cleaned with a synthetic, free-rinsing detergent and then dried with a suitable solvent such as Sherwin-Williams No. R7K156 Sure-Will Clean brand cleaner or DuPont Prep-Sol brand solvent cleaner No. 3919S to remove stains and road deposits. The surface should then be dried with a lint-free paper towel before evaporation of the solvent.

In application, the panel 30 are aligned with edges or body lines of the vehicle and the backing layer 35 is removed. The panel 30 is then pressed against the vehicle body segment starting from the registration line 73 to the opposite edge of the panel 30. A brush, squeegee or hand may be used to smoothly apply the panel 30 to the vehicle 20 and ensure that no air bubbles are in place beneath the panel 30. Masking or a similar tape 86 may be used to secure the panel 30 in registration with a body line. During application of the panels, each subsequently applied adjacent panel overlaps the previously applied panel by approximately ¼ of an inch (0.25 in.).

To remove the panels 30 and convert the vehicle back to its normal coloration, the panels 30 may be heated slightly with a hair dryer or similar device and lifted each panel edge to pull the panel off and away from the vehicle surface. In this regard, it is preferred that the pressure-sensitive adhesive used is one that softens when exposed to heat.

Figure 6:
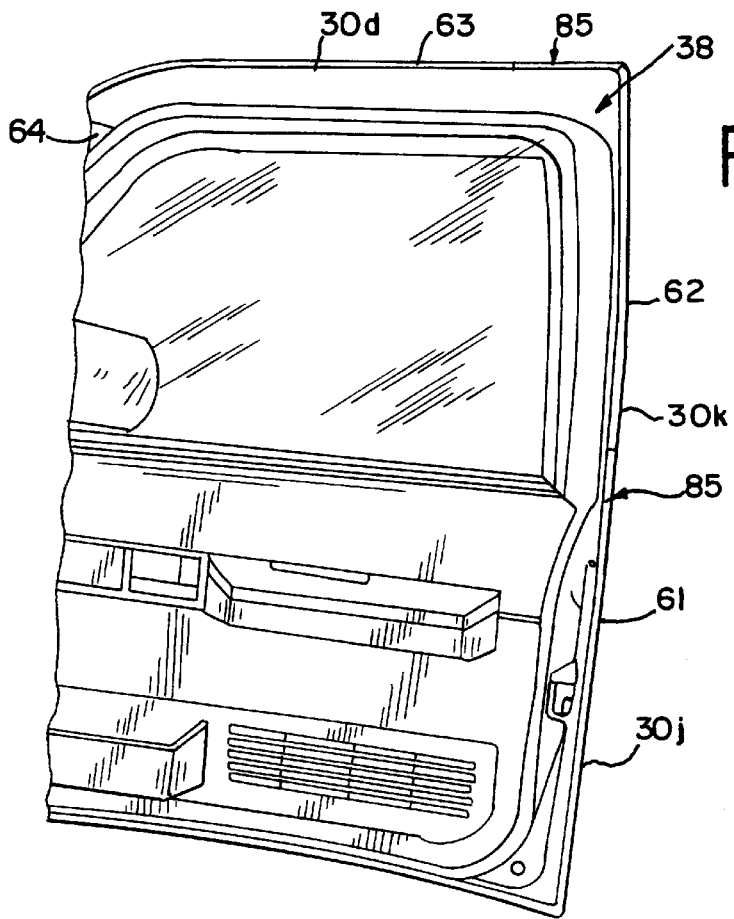
FIG. 6 is a detailed perspective view of a door of the vehicle of FIG. 1, illustrating how the marginal strip portions of the camouflage panels fold around the edges of the door.

When used on a door 38 of a vehicle, as illustrated in FIG. 6, the marginal strip portions 72 of the various door panels 30*j–m* may be folded around the outer edges 85 of the doors 38 as shown. This folding assists in retention of the door panels 30*j–m* on the door 38 as well as prevent the occurrence of an exposed edge of the panel 30 that might be caught by a passenger or driver entering the vehicle 20.

A second embodiment of the present invention is shown in FIG. 7 to be formed from sheets of material 100 that have cut, registration and mating lines 100 imprinted thereon or on their pre-mask layer. The panels 30 are not pre-cut to the shape and size of their associated body segments, but rather the cut lines identify the location(s) where a user may cut the sheets in order to form appropriately sized panels for a particular vehicle.

Although the present invention has been described with reference to certain preferred embodiments, it will be apparent to those skilled in the art that changes and modifications may be made therein without departing from the invention in its broader aspects and, therefore, the aim in the appended claims is to cover all such changes and modifications as fall within the true spirit and scope of the invention.

I claim:

1. An after-market kit for outfitting a motor vehicle with a camouflage exterior by applying a camouflage pattern to specific segments of exterior surfaces of the vehicle, the kit comprising:

a plurality of camouflage panels, each of the panels having a camouflage pattern printed on a first side thereof and a layer of adhesive disposed on a second side thereof that lies opposite said first side, said panels each having a cover portion defined thereon and a first marginal strip portion disposed adjacent a first edge of the panel cover portion and extending outwardly therefrom, and a second marginal strip portion disposed adjacent a second edge of said panel and extending outwardly therefrom, said first and second marginal strip panel edges being spaced apart from each other on said panel, said panel cover portions being approximately sized to overlie specific segments of the exterior surface of said vehicle, each of said panels further including a first registration line separating said panel cover portion from said first panel marginal strip portion and a second registration line separating said panel cover portion from said second panel margin and strip portion, said registration lines permitting accurate registration of said panel by a user over one of said vehicle exterior surface specific segments.

2. The camouflage kit of claim 1, wherein said registration lines are disposed on said panel first sides.

3. The camouflage kit of claim 1, wherein said registration lines are disposed on said panel second sides.

4. The camouflage kit of claim 1, wherein at least one of said panels is intended to cover a specific segment of said vehicle exterior surface having a curved edge, and said one panel includes a curved registration line interposed between said cover panel portion and one of said first and second marginal strip portions, and said one of first and second marginal strip portions includes a plurality of slits formed therein that extend toward said curved registration line for facilitating application of said one panel to said vehicle exterior surface specific segment by aligning said curved registration line with said vehicle curved edge.

5. The camouflage kit of claim 1, wherein said vehicle has at least one door and at least one of said kit panels is a door panel sized to cover the exterior surface of said vehicle door, said first and second marginal strip portions of said one panel being sized such that they are foldable about edges of said vehicle door so that they may be adhered to inner surfaces of said vehicle door.

6. The camouflage kit of claim 1, wherein said vehicle includes at least one quarter-panel with an exterior surface surrounding a wheel well, the wheel well being defined by a curved edge, and at least one of said kit panels is a quarter-panel sized to cover said vehicle quarter-panel exterior surface, said quarter-panel including at least one curved registration line approximating said wheel well curved edge and interposed between said cover panel portion and one of said first and second marginal strip portions of said quarter-panel, said one of said first and second marginal strip portions including a series of slits extending from and edge thereof toward said curved registration line and thereby subdividing said one of said first and second marginal strip portions, said slits permitting a user to match said quarter-panel registration line to said wheel well curved edge.

7. The camouflage kit of claim 1, wherein some of said panels include an extension portion disposed adjacent said cover panel portion and extending away therefrom, said extension portion being separated from said cover panel portion by a registration line, said extension panel portion providing a base that supports an edge of a second panel.

8. A method for converting the exterior appearance of a vehicle to a camouflage pattern, comprising the steps of:

providing a sheet of camouflage material, the camouflage material having a printed layer with a camouflage pattern disposed thereon, an adhesive layer applied to a rear side of said printed layer and a backing layer covering said adhesive layer and protecting said adhesive until said camouflage material is applied to the vehicle;

dividing said vehicle into a plurality of discrete body segments;

defining on said sheet of camouflage material, at least one camouflage panel that corresponds to at least one of said discrete body segments and further defining at least two distinct registration lines on said camouflage panel, said two distinct registration lines being spaced apart from each other and respectively oriented along two distinct edges of said panel;

aligning said camouflage panel with said vehicle one body segment by aligning said two distinct registration lines with two distinct body lines of said vehicle; and, removing said backing layer from said camouflage panel to expose said adhesive layer and pressing said adhesive layer against said vehicle body segment.

9. The camouflage kit of claim 1, wherein each of said panels includes a masking layer overlying said camouflage pattern on said first sides thereof.

10. The camouflage kit of claim 1, wherein said first and second registration lines are disposed on said masking layer.

11. The method of claim 8, further including providing a masking layer as said sheet of camouflage material overlying said printed layer thereof, and removing said masking layer after said camouflage material has been pressed against said vehicle body segment.

12. The method of claim 11, wherein said first and second registration lines are visible on said masking layer.

* * * * *